United States Patent [19]

Dessau

[11] Patent Number: 5,350,504
[45] Date of Patent: Sep. 27, 1994

[54] SHAPE SELECTIVE HYDROGENATION OF AROMATICS OVER MODIFIED NON-ACIDIC PLATINUM/ZSM-5 CATALYSTS

[75] Inventor: Ralph M. Dessau, Middlesex, N.J.

[73] Assignee: Mobil Oil Corporation, Fairfax, Va.

[21] Appl. No.: 992,668

[22] Filed: Dec. 18, 1992

[51] Int. Cl.$^5$ .............. C10G 45/10; C10G 45/44
[52] U.S. Cl. .................... 208/143; 208/142; 208/144; 585/268; 585/269
[58] Field of Search ............. 208/135, 138, 143, 142, 208/87, 144; 502/66, 74, 78; 585/268, 269

[56] References Cited

U.S. PATENT DOCUMENTS

| | | | |
|---|---|---|---|
| Re. 29,948 | 3/1979 | Dwyer et al. | 208/110 |
| 3,702,886 | 11/1972 | Argauer et al. | 423/328 |
| 4,175,033 | 11/1979 | Hifman | 208/143 |
| 4,952,303 | 8/1990 | Bortz et al. | 208/216 |
| 4,966,880 | 10/1990 | Baird, Jr. et al. | 502/242 |
| 4,990,710 | 2/1991 | Dessau et al. | 585/277 |
| 5,032,561 | 7/1991 | Onodera et al. | 502/66 |

Primary Examiner—Asok Pal
Assistant Examiner—Bekir L. Yildirim
Attorney, Agent, or Firm—Alexander J. McKillop; George W. Hager, Jr.; Charles A. Malone

[57] ABSTRACT

Non-acidic tin-, lead-, or indium-modified Pt/ZSM-5 catalysts are effective catalysts for the shape selective preferential hydrogenation of certain aromatic hydrocarbons in admixture with others. These catalysts can be used to reduce the aromatic content of gasoline and distillates.

13 Claims, No Drawings

SHAPE SELECTIVE HYDROGENATION OF AROMATICS OVER MODIFIED NON-ACIDIC PLATINUM/ZSM-5 CATALYSTS

FIELD OF THE INVENTION

This invention relates to a process for selectively hydrogenating certain aromatic components in a mixture of aromatics based on molecular size which are contained in a gasoline or distillate pool of a petroleum refinery. It also provides a method for increasing the octane rating of the gasoline by-product from a hydrofinishing process.

BACKGROUND OF THE INVENTION

The demand for gasoline as a motor fuel is one of the major factors which dictates the design and mode of operation of a modern petroleum refinery. The gasoline product from a refinery is derived from several sources within the refinery including, for example, gasoline from the catalytic cracking unit, straight run gasoline, reformate and gasoline obtained as a low boiling by-product from various refinery operations, especially catalytic processes such as catalytic dewaxing. The octane number of the gasoline from these different sources varies according to the nature of the processing and the octane rating of the final gasoline pool will depend upon the octane ratings of the individual components in the pool as well as the proportions of these components. The increasing use of unleaded gasoline coupled with increasing engine efficiencies in road vehicles has led to a demand for increased gasoline pool octane which, in turn, makes it desirable to increase the octane values of the individual components of the pool. Although there are various ways of achieving this objective, some necessarily involve compromises which may render them less attractive in a commercial refinery operation. For example, the octane rating of FCC gasoline may be improved by operating the cracker at a higher temperature (conventionally measured at the top of the riser). Similarly, reformate octane may be increased by operating the reformer at higher severity. However, in both cases, a yield loss will ensue.

In the case of by-product gasoline from catalytic dewaxing processes it may be possible to improve octane during the start-up by increasing the temperature rapidly to a value higher than normal, as described in U.S. Pat. No. 4,446,007 (Smith). However, the use of higher temperatures in dewaxing processes will also tend to decrease the yield of dewaxed products. Alternative measures for increasing pool octane are therefore still desirable.

Another trend which is perceptible in the petroleum refining industry is towards the reduction of benzene and other lower boiling point aromatics in the gasoline or distillate pool. In the United States, the Environmental Protection Agency (EPA) is considering regulation of the gasoline content and similar measures are being considered in the European Community. Benzene is particularly prevalent in reformer gasoline, being a distinctive product of the reforming process, produced by the dehydrogenation of $C_6$ cycloparaffins, the dehydrocyclization of straight chain paraffins of appropriate chain length ($C_6$) and dealkylation of other aromatics. It is produced in particularly high concentrations in the continuous catalytic reforming process which is currently replacing the conventional cyclic reforming process in the industry. It would be possible to reduce the benzene content of the reformate by a simple fractionation process but because the boiling point of benzene is close to that of other desirable and unobjectionable components of the reformate, this too would lead to a considerable loss in yield.

Therefore, what is needed is a process for selectively removing certain aromatic components contained in a mixture of aromatic hydrocarbons found in a refinery liquid fuel pool so as to reduce the aromatic content of a gasoline pool for environmental reasons and reduce soot formation in a distillate pool.

SUMMARY OF THE INVENTION

A hydrogenating process has now been devised which is capable of selectively removing certain aromatic components in a mixture of aromatic components based on molecular size which are contained in a refinery gasoline or distillate pool thereby decreasing the aromatic content of the refinery gasoline pool thereby reducing aromatic emissions. Decreased aromatic components in the refinery distillate pool results in a decrease in soot production during combustion when kerosene and jet fuels are produced from the distillate pool.

It has now been found that hydrogenating refinery gasoline and distillate feedstocks containing certain aromatic components in a mixture of other aromatic components results in the selective formation of cycloalkanes based on a desired molecular size of the aromatic component. This hydrogenating process comprises a one-stage process utilizing, as a catalyst, a non-acidic, microporous crystalline Pt/ZSM-5 material containing a hydrogenating metal and modifiers such as tin, lead, or indium. During the hydrogenating process, only those aromatic components which can enter the Pt/ZSM-5 modified catalyst are converted to cycloalkanes. Bulkier polyalkyl aromatics too large to enter the catalyst are not converted.

This process generally comprises contacting the feedstock at a temperature between about 100° C. (212° F.) and about 400° C. (752° F.) and a pressure between about atmospheric and 500 psig with a catalyst in the presence of hydrogen, in which the hydrogen-to-feedstock ratio is between about 500 and 2,000 standard cubic feet of hydrogen per barrel of feed. The feedstock is contacted with the catalyst in a fixed bed at a liquid hourly space velocity between about 0.1 and 20.

In a preferred embodiment, the catalyst is used as a hydrofinishing catalyst for the selective conversion of certain aromatics to cycloalkanes in the hydrotreating (HDT) stage of a lube oil hydroprocessing process.

It is therefore an object of this invention to provide a platinum/ZSM-5 zeolite catalyst modified with tin, lead, or indium to selectively hydrogenate certain aromatic hydrocarbons in admixture with other aromatics.

It is another object of this invention to provide for a process for catalytically hydrogenating a gasoline refinery pool to produce a pool reduced in certain aromatic components which selectively enter a Pt/ZSM-5 modified tin, lead, or indium catalyst so as to obtain a gasoline pool that is substantially more environmentally acceptable.

It is yet another object of this invention to provide for a catalytic hydrotreating process which utilizes a distillate refinery pool containing an admixture of aromatic components to produce a distillate refinery pool reduced in aromatic content based on molecular size.

DESCRIPTION OF THE PREFERRED EMBODIMENTS

In the present process, an aromatic containing fraction obtained from a petroleum refinery stream is contacted with a platinum/ZSM-5 microporous crystalline catalyst modified with tin, lead, or indium in a catalytic hydrofinishing reactor under hydrotreating conditions. The reaction is allowed to continue for a time sufficient to convert selectively certain aromatic components to cycloalkanes. Only those aromatic components which are of a size sufficient to enter into the catalyst are hydrogenated to their cycloalkane components which contain a corresponding number of carbon atoms. Generally, aromatic components which enter the pores of the catalyst will comprise benzene, toluene, and xylenes which are collectively referred to as (BTX). Other representative aromatics of a size sufficient to enter the pores of the catalyst include monoalkylbenzene and beta-alkyl-naphthalene. Bulkier polyalkylaromatics too large to enter the pores of the catalyst are excluded and remained unchanged. A catalytic dewaxing procedure where a ZSM-5 or other aluminosilicate zeolite catalyst is employed that teaches a hydrofinishing step which step can be utilized herein is disclosed in U.S. Pat. No. 4,952,303 which issued to Bortz et al. on Aug. 28, 1990. This patent is hereby incorporated herein by reference.

This process generally comprises contacting the feedstock at a temperature between about 100° C. and about 400° F. and a pressure between about atmospheric and 500 psig with a catalyst in the presence of hydrogen, in which the hydrogen-to-feedstock ratio is between about 500 and 2,000 standard cubic feet of hydrogen per barrel of feed. The feedstock is contacted with the catalyst in a fixed bed at a liquid hourly space velocity between about 0.1 and 20.

The preferred source of the aromatic component containing fraction is a reformate i.e., a refinery stream which has been subjected to catalytic reforming, preferably over a reforming catalyst containing platinum. Other refinery streams containing significant quantities of aromatics and with a suitable boiling range of about $C_5$ to 100° C. ($C_5$ to about 203° C.), usually $C_5$ to 330° F. ($C_5$ to about 165° C.) may, however, be used. Kerosine distilled from the crude unit is an example of a distillate stream from which certain aromatic hydrocarbons can be converted to cycloalkanes when admixed with bulkier polyalkyl aromatics.

Reformates usually contain $C_6$ to $C_8$ aromatic hydrocarbons and $C_5$ to $C_6$ paraffinic hydrocarbons with the aromatic hydrocarbons being constituted mainly by benzene, toluene, xylene and ethyl benzene. Compositions for reformates which may be used in the present process are shown in Table 1 below:

TABLE 1

| | Reformate Composition | | |
|---|---|---|---|
| | Broad | Intermediate | Narrow |
| Specific Gravity | 0.72 to 0.88 | 0.76 to 0.88 | 0.76 to 0.83 |
| Boiling Range, | | | |
| °F. | 60 to 400 | 60 to 400 | 80 to 390 |
| °C. | 15 to 205 | 15 to 205 | 27 to 200 |
| Mole % | | | |
| Benzene | 5 to 60 | 5 to 40 | 10 to 30 |
| Toluene | 5 to 60 | 10 to 40 | 10 to 40 |
| $C_8$ Aromatic[1] | 5 to 60 | 5 to 50 | 5 to 15 |

[1]Xylene and ethyl benzene component.

The composition of a typical reformer stream from a platinum reforming process is given in Table 2 below.

TABLE 2

| Reformate Composition | |
|---|---|
| | Mol. Pct. |
| $C_4$ | 0.2 |
| $C_5$ | 15.5 |
| Non-arom. $C_6$ | 10.2 |
| Benzene | 25.8 |
| Non-arom. $C_7$ | 0.2 |
| Toluene | 34.9 |
| $C_8$ aromatics | 10.2 |
| $C_9$ aromatics | 3.0 |

As may be seen from the above figures, benzene constitutes a significant proportion of the reformate stream and if no measures are taken to remove it, it will pass into the refinery gasoline pool unchanged. The present method provides a convenient way of converting the benzene to cyclohexanes which are not objectionable environmentally and which conversion also increases the yield of the gasoline pool.

The Catalysts

The catalyst comprises a Group VIII metal and a non-acidic microporous material. The non-acidic microporous material can also be "crystalline" in the sense that it has a unique X-ray diffraction pattern. The X-ray diffraction pattern of ZSM-5 has been described in U.S. Pat. No. 3,702,886 and Re No. 29,948 each of which is incorporated by reference herein. Preferably, the microporous crystalline material contains a modifier selected from the group consisting of tin, indium, or lead. The preferred catalysts are described in allowed U.S. Pat. application Ser. No. 418,377, filed Oct. 6, 1989, and its parent, U.S. Pat. No. 4,990,710, each of which is relied upon and incorporated by reference herein.

The amount of Group VIII metal in the non-acidic catalyst composition employed can range from about 0.05 to 10 weight percent and preferably 0.1 to 5 weight percent of the microporous material. In a preferred embodiment, platinum is the Group VIII metal in the non-acidic catalyst composition. However, the metal can be any Group VIII metals including those of the platinum group (platinum, iridium, and palladium).

The modifier content of the crystalline microporous materials can range from about 0.01 to 20 weight percent. Practically, the modifier content will range from about 0.1 to 10 weight percent.

The crystalline microporous materials of the invention can be medium pore zeolites characterized by Si/Al ratios of at least 10 that have a pore size of about 5 to about 6.5 Angstroms. However, the silica:alumina ratio of the zeolite can be up to 1,000 or greater. In a preferred embodiment the aluminum content of these materials is less than about 1 weight percent and more preferably less than about 0.1 weight percent. Zeolite materials which can be used herein include ZSM-5, ZSM-11, ZSM-22, ZSM-23, ZSM-35, and MCM-22.

The compositions comprising Group VIII metal-containing catalysts do not exhibit any appreciable acid activity. These catalysts would meet the criteria of non-acidic catalysts described by Davis et al., *J. Catal.,* 15, 363 (1969).

The crystalline microporous material has an X-ray diffraction pattern which corresponds to a zeolite, SAPO, ALPO, etc. The preferred microporous crystalline materials are crystalline in the sense that they are identifiable as isostructural with zeolites by X-ray powder diffraction pattern. Preferred zeolites are those having the structure of ZSM-5.

Incorporation of the modifier and other elements, such as indium, tin, or lead, was accomplished during synthesis of the high silica/ alumina ZSM-5 zeolites. Platinum was incorporated via ion-exchange with $Pt(NH_3)_4Cl_2$, followed by calcination in air to 350° C. Crystal sizes were all about 1 micron.

Competitive hydrogenation of equimolar mixtures of ortho- and para-xylene was conducted in excess hydrogen at 300 psig and 250–325° C. Liquid products were collected in a cold trap and analyzed on a DB-1 capillary column of a gas chromatographic apparatus. All products were identified by comparison to authentic samples.

In a preferred embodiment the pore size of the microporous crystalline silicates ranges from about 5 to about 6.5 Angstroms. For a more complete description of these zeolites, reference is made to the *The Atlas Of Zeolite Structure Types* (1992) by W. M. Meier and D. H. Olson published by Butterworth Publishers. In a preferred embodiment the microporous crystalline material exhibits the structure of ZSM-5, by X-ray diffraction pattern. When as the in embodiments herein, the crystalline material exhibits an X-ray diffraction pattern of a zeolite, at least some of the hydrogenation metal may be intrazeolitic, that is, some of that metal is within the pore structure of the crystal, although some of that metal can be on the surface of the crystal. A test for determining whether, for example, Pt is intrazeolitic or extrazeolitic in the case of ZSM-5 is reported by R. M. Dessau, *J. Catal.* 89, 520 (1984). The test is based on the selective hydrogenation of olefins.

The methods of synthesizing these preferred materials are described in U.S. Pat. No. 4,990,710 which is relied upon and incorporated by reference herein.

The non-acidic, crystalline, microporous, Group VIII metal containing materials used in the invention can be combined with a matrix or binder material to render them attrition resistant and more resistant to the severity of the conditions to which they will be exposed during use in hydrocarbon conversion applications. The combined compositions can contain 1 to 99 weight percent of the materials of the invention based on the combined weight of the matrix (binder) and material of the invention. The relative proportions of finely divided crystalline material and inorganic oxide gel matrix vary widely, with the crystal content ranging from about 1 to about 90 percent by weight and more usually, particularly when the composite is prepared in the form of beads, in the range of about 2 to about 80 weight percent of the composite. When used with a matrix or binder, the catalyst of the invention will preferably be combined with non-acidic matrix or binder materials. A preferred matrix or binder material would be silica or titania.

The catalysts may be regenerated by conventional techniques including high pressure hydrogen treatment and combustion of coke on the catalyst with an oxygen-containing gas.

The competitive hydrogenation of an equimolar mixture of ortho- and para-xylene to dimethylcyclohexanes was investigated at 325° C. (617° F.) and 300 psig. The yields (mol %) of the various dimethylcyclohexanes (DMCH) produced, 1,4-DMCH from para-xylene and 1,2-DMCH from ortho-xylene, as well as the ratio of these products are shown in Table 3 below:

TABLE 3

| Catalyst | tr-1,4 | cis-1,4 | tr-1,2 | cis-1,2 | 1,4/1,2 |
| --- | --- | --- | --- | --- | --- |
| Non-selective | | | | | |
| Pt/Si-ZSM-5 | 18.2 | 8.0 | 13.7 | 6.6 | 1.3 |
| Pt/Ti-ZSM-5 | 8.5 | 6.2 | 6.0 | 5.5 | 1.3 |
| Pt/Zr-ZSM-5 | 7.9 | 8.8 | 4.1 | 10.3 | 1.2 |
| Pt/[B]zeolite[a] beta | 10.6 | 7.6 | 7.0 | 6.7 | 1.3 |
| Selective | | | | | |
| Pt/Sn-ZSM-5 | 28.2 | 10.9 | 1.08 | 0.32 | 28 |
| Pt/Pb-ZSM-5 | 16.0 | 6.7 | 0.36 | 0.12 | 47 |
| Pt/In-ZSM-5 | 9.9 | 5.0 | 2.9 | 2.7 | 2.7 |

[a] At 250° C. (482° F.), 75 psig.

Shape selective preferential hydrogenation of para-xylene was observed for tin-, lead-, and indium-modified Pt/ZSM-5 catalysts.

The competitive hydrogenation of an equimolar mixture of benzene, toluene, and para-xylene was investigated at 250° C. and 300 psig over both a para-selective Pt/[Sn]ZSM-5. The results are shown in Table 4, below:

TABLE 4

| Catalyst | Hydrogenation (Hydr) of BTX | | |
| --- | --- | --- | --- |
| | % Benz Hydr | % Tol Hydr | % Para-Xyl Hydr |
| Pt/[Sn]ZSM-5 | 69 | 44 | 17 |

In both cases, the order of reactivity was benzene > toluene > para-xylene. This order contrasts with that observed over sulfided Ni/W on alumina ( J. L. LePage in a publication entitled "Applied Heterogeneous Catalysis", published by Gulf Publishing Co., Houston, Tex., 1987 on page 371).

Shape selective hydrogenation of para-xylene relative to ortho-xylene was achieved over tin, lead, and indium modified Pt/ZSM-5 catalysts. The failure to observe similar selectivities for unmodified Pt/ZSM-5 catalysts demonstrates the anchoring effect of these modifiers in suppressing platinum migration out of zeolitic channels.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed:

1. A process for the shape selective preferential hydrogenation of certain aromatic components in a mixture of aromatic hydrocarbonaceous components based on molecular size comprising:

hydrotreating a feed containing a mixture of aromatic hydrocarbonaceous components under hydrotreating conditions at a temperature of from about 100° C. to about 325° C. in the presence of a non-acidic crystalline microporous ZSM-5 catalyst containing a Group VIII metal modified with a metal selected from a member of the group consisting of tin, lead, or indium for a time sufficient to convert aromatic components having a molecular size sufficient to pass through said catalyst to cycloalkanes thereby producing an effluent with a reduced aromatic content.

2. The process as recited in claim 1 where the Group VIII metal is platinum modified with tin.

3. The process as recited in claim 1 where the feed is a refinery reformate stream.

4. The process as recited in claim 1 where the crystalline microporous catalyst has a crystalline structure that contains aluminum in the amount of less than about 0.1 weight %.

5. The process as recited in claim 1 where the feed is a refinery distillate stream and the effluent therefrom has reduced soot formation upon combustion when compared to the feed prior to hydrotreating.

6. The process as recited in claim 1 where the Group VIII metal is platinum.

7. The process as recited in claim 1 where the feed is a refinery reformate stream or a distillate stream and a converted aromatic component is benzene thus causing a reduction in the benzene content of said stream.

8. The process as recited in claim 1 where hydrotreating is conducted at a liquid hourly space velocity of from about 0.5 to about 20, a pressure of about atmospheric to about 500 psig, a temperature of from about 100° to about 325° C., and a once-through hydrogen circulation rate of about 500 to about 2,000 standard cubic feed per barrel of feed.

9. A process for the shape selective preferential hydrogenation of certain aromatic components in a reformate containing a mixture of aromatic hydrocarbonaceous components based on molecular size comprising:
hydrotreating a feed containing a mixture of aromatic hydrocarbonaceous components under hydrotreating conditions at a temperature of from about 100° C. to about 325° C. in the presence of a non-acidic crystalline microporous ZSM-5 catalyst containing platinum modified with tin for a time sufficient to convert aromatic components having a molecular size sufficient to pass through said catalyst to cycloalkanes thereby producing a reformate effluent with a reduced aromatic content.

10. The process as recited in claim 9 where the crystalline microporous catalyst has a crystalline structure that contains aluminum in the amount of less than about 0.1 weight %.

11. The process as recited in claim 9 where the feed is a refinery distillate stream and the effluent therefrom has reduced soot formation upon combustion when compared to the feed prior to hydrotreating.

12. The process as recited in claim 9 where the feed is a refinery reformate stream or a distillate stream and a converted aromatic component is benzene thus causing a reduction in the benzene content of said stream.

13. The process as recited in claim 9 where hydrotreating is conducted at a liquid hourly space velocity of from about 0.5 to about 20, a pressure of about atmospheric to about 500 psig, a temperature of from about 100° to about 325° C., and a once-through hydrogen circulation rate of about 500 to about 2,000 standard cubic feet per barrel of feed.

* * * * *